Figure 1:
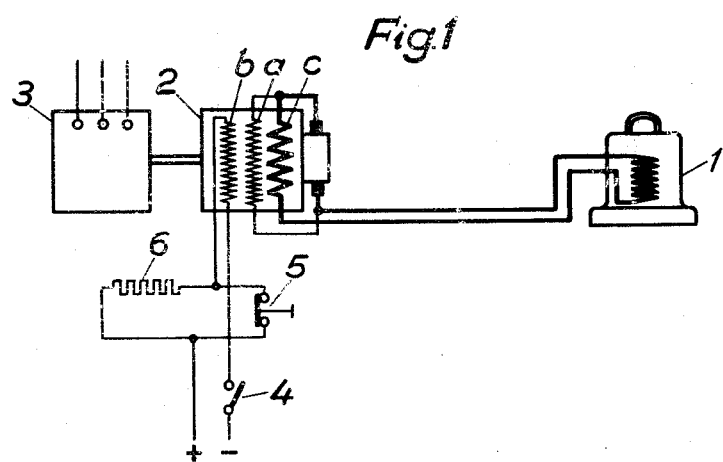

Oct. 24, 1950   F. LANDAU   2,526,882
CONTROL SYSTEM
Filed March 1, 1949

Inventor
Frans Landau
By [signature]
Attorney.

Patented Oct. 24, 1950

2,526,882

UNITED STATES PATENT OFFICE 2,526,882

CONTROL SYSTEM

Frans Landau, Vasteras, Sweden, assignor to Allmanna Svenska Elektriska Aktiebolaget, Vasteras, Sweden, a Swedish corporation Application March 1, 1949, Serial No. 79,041
In Sweden March 13, 1948

1 Claim. (Cl. 175—181)

In the operation of scrap steel magnets, it is desirable to supply and to interrupt the magnetizing current of the magnet in such a way, that when current is supplied the magnet is rapidly magnetized, and when the current is interrupted, the magnet is rapidly de-magnetized. In the system used hitherto, the magnet generally is connected to a direct current source by means of a controller operated series resistance. The disconnection is performed in such a manner, that in the first position and also in the zero position a parallel resistance is coupled to the scrap steel magnet. In order to effect a rapid de-magnetization, the controller is provided with a couple of reverse current positions, on which the magnet is connected to the direct current source in opposite current direction and in series with the controller resistance, so that a certain negative magnetizing is attained and thus an effective de-magnetization.

Also in the case where the magnet is provided with a separate direct current generator and the regulation is performed by the field of the generator, a controller and a resistance in series with the field winding is used. Said controller has a reversal position in which the field is reversed in order to achieve a rapid de-magnetization of the magnet.

Due to the fact that the ohmic resistance of the magnet varies considerably with the heating of the magnet, there is a considerable variation in the power of the magnet depending on the temperature of the magnet. So, for instance, the magnet, which requires 6 kw., when the thermal balance is reached, may require not less than 10 kw. when it is cold. The generator feeding the magnet must thus be dimensioned for 10 kw. in spite of the fact that only 6 kw. can be utilized after that balance is reached. This depends thereupon that the thermal time constant of the generator is considerably less than that of the magnet, so that it is not possible to provide a generator only intended to deliver 6 kw. and to run it under overload during the time when the magnet is cold.

The present invention has for its object to provide a regulating device in which the scrap steel magnet is fed by a direct current generator with three windings, of which one is a shunt winding, one is a series winding opposing the shunt winding, and one is a separately fed winding co-acting with the shunt winding, the last winding being fed by a direct current source with constant voltage and connected with this current source at the connecting-in of the scrap steel magnet. If this shunt winding is so dimensioned that its resistance line coincides with the straight part of the magnetization curve of the generator, the current through the series winding will have such a value that the ampereturns from it will be equal to the ampereturns from the separately fed winding.

Such a generator with three field windings is known per se, and is generally used as an exciter for the regulation of constant current through a direct current motor. In this case, however, it has not only to perform the regulation to a constant current through the scrap steel magnet, but also by utilization of the larger reactance of the magnet and by a suitable dimensioning of the windings of the generator to effect an over-swinging of the voltage of the generator to a negative value, when the separately fed winding is disconnected, thus causing an effective de-magnetization of the magnet.

Figure 2:
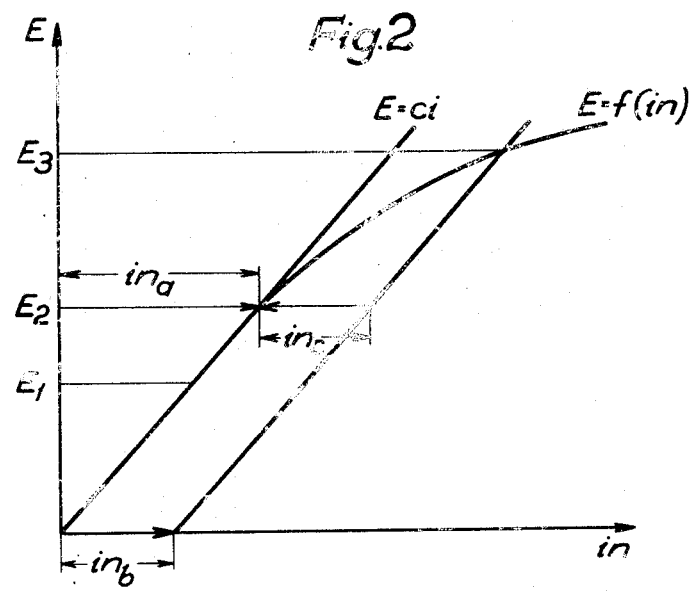

On the accompanying drawing, Fig. 1 shows a winding diagram for the operating device; and Fig. 2 is a graph.

Referring to Fig. 1, the reference numeral 1 designates the scrap steel magnet and 2 the generator to which the magnet is coupled; 3 is the motor driving the generator and 4 a switch for controlling the supply of current to the magnet; 5 is a push button contact for short circuiting the resistance 6. The separately fed winding of the generator is designated by $b$, the shunt winding with $a$ and the series winding with $c$.

In Fig. 2, in which the ordinate line represents the voltage E and the abscissa line the excitation ampereturns $(in)$ curve $E=f(in)$ designates the magnetization curve of the generator. The curve $E=ci$ designates the resistance line of the generator. $In_a$ are the ampereturns attained by the shunt winding $a$ of the generator, $in_b$ are the ampereturns of the separately fed winding $b$, which co-act with the winding $a$, and $in_c$ are the ampereturns of the winding $c$ counter-acting the windings $a$ and $b$.

Due to the fact that the series winding $c$ counter-acts the two other co-acting windings $a$ and $b$, a constant current always is attained through the magnet, independent of its temperature.

The operation of the device will be clearly understood from the following:

Referring to Fig. 2, $E_1$ is assumed to designate the voltage necessary to feed the scrap steel magnet with the normal current I when the winding of the magnet is cold, $E_2$ is the voltage which is required for feeding the magnet when its winding is warm, and $E_3$ the voltage attained in the magnet coil when winding $b$ is initially placed in operation. When the circuit of the separately fed excitation winding $b$ is open, the generator will not give any voltage, due to the fact, that if the excitation winding $a$ should give a voltage, there would also be a current through the winding of the magnet, and this current through the excitation winding $c$ would counter-act the winding $a$, and thus de-magnetize the generator.

When connecting the winding $b$ to the direct current source, in the first instance a voltage $E_3$ is achieved, which is considerably higher than the definite service voltage $E_2$, so that the increase of the current through the magnet is accelerated. Due to the large reactance of the scrap steel magnet, the current would rise too slowly if the magnet were connected only to the normal voltage. When the current rises to its normal value, corresponding to the ampereturns $in_c$ in the counter-acting winding $c$, which is equal to the ampereturns $in_b$ corresponding to the current set in the separately fed winding $b$, the voltage of the generator will decrease to the value $E=IR$, where I designates the normal current of the scrap steel magnet, and R the ohmic resistance of the magnet. The current I is automatically held constant independently of the temperature of the magnet, so that the generator voltage will change in the same proportion as the resistance in the magnet winding. In the beginning, when the magnet is cold and the resistance value low, $E_1$ is lower than the voltage $E_2$, which value is attained when the magnet is warm. It is only necessary to design the generator for the voltage $E_2$ and the current I. A generator without automatic voltage regulation, on the contrary, must be dimensioned for the voltage $E_2$ and the current $I_2$, which is larger than I, because the ohmic resistance in the scrap steel magnet, when it is cold, is less than when the magnet is warm.

When the short circuiting of the resistance 6 is interrupted by actuating the push button 5, so that the resistance 6 temporarily is connected in, a swinging down of the current is attained, which effects that goods loosely attracted by the magnet will be dropped.

When the switch 4 is open, so that the current through the winding $b$ ceases, the voltage of the generator rapidly decreases, due to the fact, that the excitation from the series winding $c$ dominates the excitation from the shunt winding $a$, and will even cause a reversal of the polarity of the generator and a current impulse through the scrap steel magnet in opposite direction, so that the goods attracted by it are rapidly dropped. This swinging depends upon the inductance of the scrap steel magnet being considerably larger than that of the generator field.

I claim as my invention:

Arrangement for the operation of a scrap steel magnet, comprising an operating coil for the magnet, a rotating direct current generator having an armature and brushes directly connected to said coil and having a stator field structure having three excitation windings including a shunt winding connected to the said brushes, a separately fed winding adapted to aid said shunt winding and a series winding connected in series with the operating coil of said magnet adapted to counteract both said shunt winding and said separately fed winding, a constant voltage direct current source connected to said separately fed winding, a switch in series with said separately fed winding, the resistance of said shunt winding having such a value as to make the resistance line of said generator coincide with the straight part of the magnetization curve of said generator, the time constant of the field of said generator having a value smaller than that of the operating coil of said scrap steel magnet, a resistance connected in series with said separately fed winding, an interrupting switch connected in parallel with and normally shortcircuiting said resistance, and a prime mover driving said generator.

FRANS LANDAU.

REFERENCES CITED

The following references are of record in the file of this patent:

FOREIGN PATENTS

| Number | Country | Date |
|---|---|---|
| 5,890 of 1907 | Great Britain | 1907 |